March 16, 1965 V. H. SELIGER 3,174,033

ANALOG MULTIPLIER-DIVIDER

Filed March 24, 1960

INVENTOR
VICTOR H. SELIGER
BY Borst & Borst
ATTORNEYS

United States Patent Office 3,174,033
Patented Mar. 16, 1965

3,174,033
ANALOG MULTIPLIER-DIVIDER

Victor H. Seliger, Lynbrook, N.Y., assignor to Sperry Rand Corporation, Ford Instrument Company Division, Wilmington, Del., a corporation of Delaware Filed Mar. 24, 1960, Ser. No. 17,421
11 Claims. (Cl. 235—195)

This invention relates to computers and particularly to analog devices which are capable of performing multiplication and/or division of their analog inputs.

Hitherto analog multipliers have typically employed precision sliding-contact devices such as linear potentiometers to multiply analogs which are mechanically or electrically represented in their inputs. It is recognized that these devices are subject to failure due to corrosion and wear and have, therefore, limited utility in mobile and military applications. Other conventional arrangements, not using such potentiometers, are burdened by undue complexity in design or have insufficient accuracy and reliability. According to this invention, there is provided a pair of identical, special purpose devices such as sine resolvers or linear transformers in driving connection with a servo loop which includes a variable gain amplifier. No slide wire potentiometer is employed as a computing component as in the usual devices of this nature. Gain compensation for the amplifier to insure high stability and polarity control thereof may be provided and for this purpose sliding contact devices of the potentiometer type or other types may be employed.

One object of the invention is to provide an analog multiplying device of high accuracy and reliability and of relatively simple design.

Figure 1:
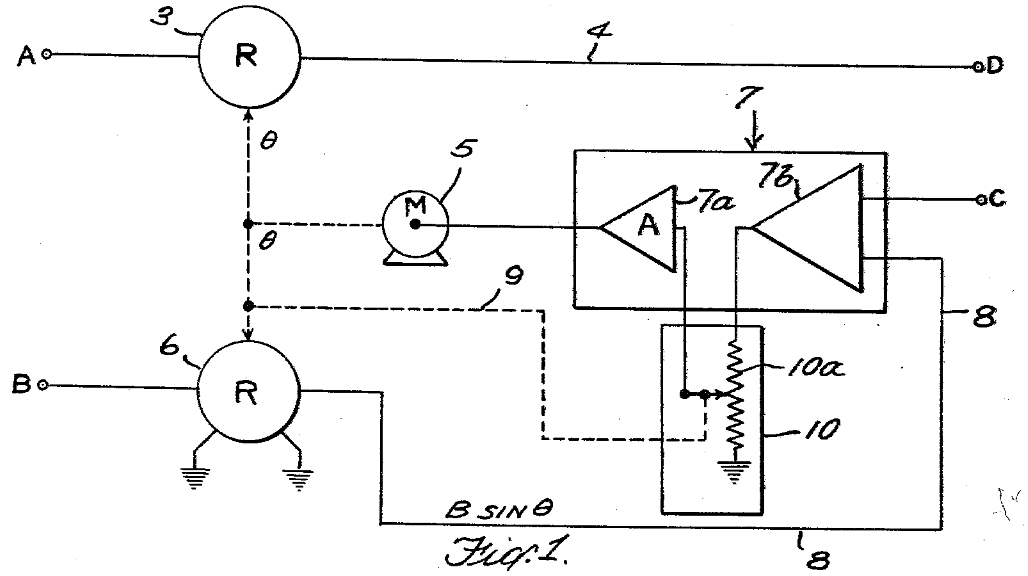
Figure 2:
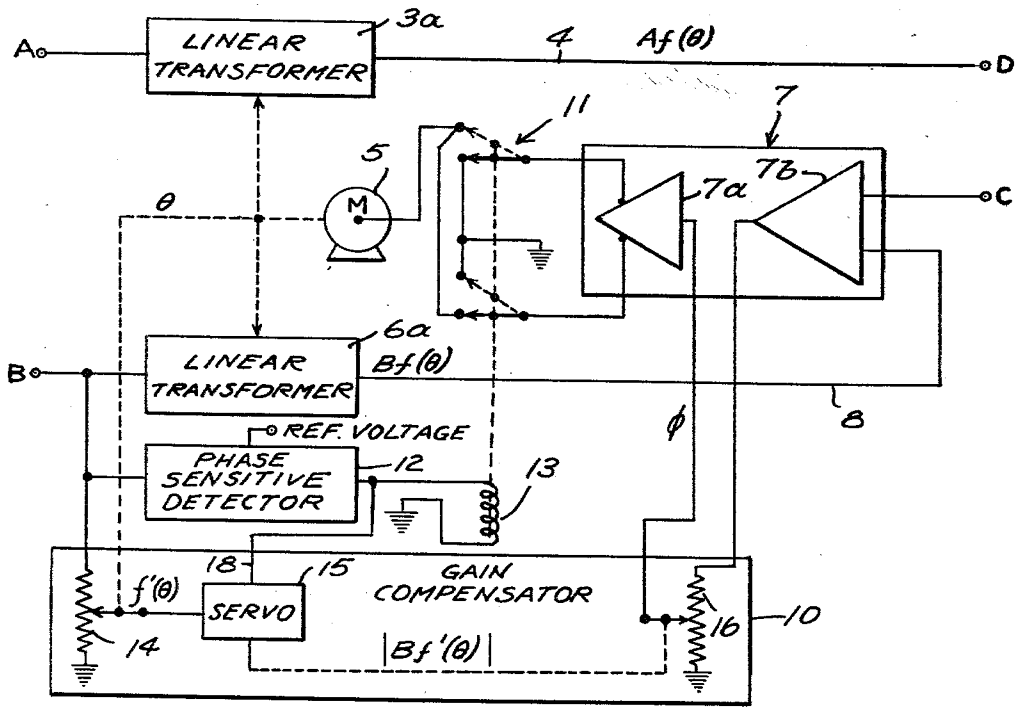

Other objects and advantages of the invention may be appreciated on reading the following detailed description of two embodiments thereof, the description being taken in conjunction with the accompanying drawings, in which FIG. 1 is a schematic of the analog multiplying-dividing device, and FIG. 2 is a schematic of a modification of same.

Referring to FIG. 1, a sine function resolver 3 having an electrical input terminal A and an electrical output connection 4 is driven by servo motor 5. A second sine resolver 6 having an input terminal B is also driven by the motor 5. A variable gain amplifier unit 7, which includes an amplifier $7^a$ and separate amplifier $7^b$, has a signal input terminal C and receives the output of the resolver 6 on a second signal input lead 8. The terminal C and lead 8 are connected to the input of the amplifier $7^b$ so that the signals emanating from the resolver 6 and the terminal C are in control opposition.

The variable gain amplifier 7 is gain compensated by the gain compensator 10. The gain compensator comprises a nonlinear potentiometer $10^a$ which is arranged to yield values to the amplifier $7^a$ which are generated by the function $$\frac{1}{\cos\theta}$$

This potentiometer is energized by the amplifier $7^b$ and its tap is connected to the input of amplifier $7^a$ being mechanically positioned by the shaft 9 which is driven by the motor 5.

If $\theta$ represents the motor output and B the electrical input on the resolver 6, it is apparent that the motor will drive the resolver 6 until the multiplied quantity $B \sin\theta$ is equal to the input voltage C on the terminal C in the control circuit of the amplifier $7^b$ which is then equal to $B \sin\theta$. Because resolver 3 is also a sine resolver and is servoed by the motor output $\theta$, its output D on the lead 4 is $A \sin\theta$ if a voltage A is impressed on the terminal A and hence the output must be equal to $$\frac{AC}{B}$$

This follows from the relation established above, namely that $\sin\theta$ is equal to $$\frac{C}{B}$$

It is assumed that $\theta$ is an angle falling between $-90°$ and $+90°$.

When the input voltage B is variable, and/or when it is desirable to employ transducers other than resolvers, the modified arrangement shown in FIG. 2 may be employed. The resolvers disclosed in FIG. 1 are replaced in this arrangement by linear transformers $3^a$ and $6^a$ as the electromagnetic elements. These transformers can function outside of their normal linear range due to the particular circuitry being employed therewith. Transformers $3^a$ and $6^a$ are characterized by the relationship:

Voltage output=voltage input×a function of shaft position the function being any monotonic function and identical function being selected for the transformers.

It is apparent that the motor 5 will drive the transformer $6^a$ to the position at which the multiplied quantity $Bf(\theta)$ is equal to the input voltage C, on the terminal C, in the control circuit of the amplifier $7^b$. Since the transformer $3^a$ is also servoed by the motor output $\theta$, its output D on the lead 4 is $Af(\theta)$ if a voltage A is impressed on the terminal A. Thus, since $$f(\theta)=\frac{C}{B}$$

the output D is equal to $$\frac{AC}{B}$$

The input to the motor 5 can be changed in phase by 180° by the polarity reversing switch 11 which is disposed between the amplifier 7 and the motor. The change in phase will be required if the input B changes sign. To accomplish this change in phase, a phase sensitive detector 12 is connected between the input side of the linear transformer $6^a$ and the relay coil 13. The relay coil controls the position of the double pole double throw relay contacts 11. The phase sensitive detector is responsive to any change in the sign of the input B and, in effect, causes the phase of the input to the motor 5 to change by 180°, thus making the stability of the servo loop possible.

The gain of the amplifier 7 is controlled in magnitude by the gain compensator 10 in such a manner as to keep the loop gain of the servo approximately constant over the operating ranges of B and C. This gain compensator is provided with a nonlinear potentiometer 14 which generates the function $$f'(\theta)=\frac{df(\theta)}{d\theta}$$

The nonlinear potentiometer 14 is energized by the voltage appearing at the terminal B, and its tap is positioned by the motor 5. Accordingly, it is adapted to yield the product $Bf'(\theta)$ to its output. This output serves to drive the servo 15. An inverting potentiometer 16, which is energized by the amplifier $7^b$, has its wiper positioned by the servo 15 in accordance with the servo output $|Bf'(\theta)|$. Servo 15 is adapted to provide as its output $|Bf'(\theta)|$ by virtue of the signal from the phase sensitive detector 12. This signal is introduced to servo 15 by means of lead 18 and is adapted to reverse the polarity of the excitation to the response element of servo 15 and the reference phase voltage of the servo motor (not shown) in servo 15. The wiper of potentiometer 16 is connected to the input of the amplifier $7^a$. The output $\phi$ of the inverting potentiometer 16 thus represents a constant K divided by the quantity $|Bf'(\theta)|$, multiplied by the output of servo amplifier $7^b$. The amplifier 7 is thereby gain compensated.

Loop gain is $$K_C=kK_M\cdot B\cdot\frac{df(\theta)}{d\theta}K_A$$

where $K_A$=total amplifier gain, $K_M$=motor torque/voltage, $k$=a constant, $K_C$=loop gain. Since $k$ and $K_M$ are constant, for $K_C$ to be constant requires $$K_A\alpha\frac{1}{B\frac{df(\theta)}{d\theta}}$$

as provided by the implementation described. Since $$\frac{df(\theta)}{d\theta}$$

depends only on $\theta$ which in turn depends on B and C in the steady state i.e., $f(\theta)=C/B$, we may alternately write $K_A=g(B, C)$; the gain compensator may therefore alternately function to control the amplifier gain as a prescribed function of the values of B and C. If B is constant, the gain compensator need only have either $\theta$ or C as its input.

Various modifications of the basic multiplier-divider computer as above described may be made by persons skilled in the art without departing from the principle of the invention and the scope thereof as defined in the appended claims.

What is claimed is:

1. An analog multiplier-divider comprising a variable gain amplifier unit having a first amplifier and a separate second amplifier, again compensator interposed between said first and second amplifier, an input terminal through which input signals are adapted to be imparted to said first amplifier, a first electromagnetic transducer having an input terminal through which input signals are adapted to be imparted thereto and an output terminal through which the output of said first electromagnetic transducer is imparted to a receiver, a second electromagnetic transducer adapted to generate the same function as said first transducer and having an input terminal through which input signals are adapted to be imparted thereto and an output lead through which the output of said second electromagnetic transducer is imparted to said first amplifier, a servo motor, means through which the output of said first amplifier is imparted to said second amplifier, conductor means through which the electrical output of said second amplifier is imparted to said servo motor, and means through which said first and second electromagnetic transducers are driven by the mechanical output of said servo motor.

2. An analog multiplier-divider as defined in claim 1 in which each of said electromagnetic transducers comprises a sine function resolver.

3. An analog multiplier-divider as defined in claim 1 in which each of said electromagnetic transducers comprises a linear transformer.

4. An analog multiplier-divider comprising a variable gain amplifier unit having an input terminal through which input signals are adapted to be imparted thereto, a first electromagnetic transducer having an input terminal through which input signals are adapted to be imparted thereto and an output terminal through which the output of said first electromagnetic transducer is imparted to a receiver, a second electromagnetic transducer adapted to generate the same function as the first transducer and having in input terminal through which input signals are adapted to be imparted thereto and an output lead through which the output of said second electromagnetic transducer is imparted to said variable gain amplifier, a servo motor, a gain compensator comprising a nonlinear potentiometer connected into said variable gain amplifier and driven by the output of said servo motor, conductor means through which the output of said variable gain amplifier unit is imparted to said servo motor, and means through which said first and second electromagnetic transducers are driven by the mechanical output of said servo motor.

5. An analog multiplier-divider as defined in claim 4 in which each of said electromagnetic transducers comprises a sine function resolver.

6. An analog multiplier-divider as defined by claim 4 in which each of said electromagnetic transducers comprises a linear transformer.

7. An analog multiplier-divider as defined by claim 1 in which a gain compensator for said variable gain amplifier unit is interposed between the first and second amplifier thereof.

8. An analog multiplier-divider as defined by claim 7 in which said gain compensator comprising a non-linear potentiometer which is energized by said first amplifier and is provided with a tap which is adapted to be positioned by the mechanical output of said servo motor.

9. An analog multiplier-divider as defined by claim 4 which includes: a polarity reversing switching means which is interposed between said variable gain amplifier unit and said servo motor, a relay by which said switching means is adapted to be actuated, and a phase sensitive detector by which the energization of said relay is controlled, said phase sensitive detector being connected to the input terminal of said second electromagnetic transducer.

10. An analog multiplier-divider comprising a variable gain amplifier unit having a first amplifier and a separate second amplifier, a gain compensator interposed between said first and second amplifier, an input terminal through which input signals are adapted to be imparted to said first amplifier, a first electromagnetic transducer having an input terminal through which input signals are adapted to be imparted thereto and an output terminal through which the output of said first electromagnetic transducer is imparted to a receiver, a second electromagnetic transducer adapted to generate the same function as said first transducer and having an input terminal through which input signals are adapted to be imparted thereto and an output lead through which the output of said second electromagnetic transducer is imparted to said first amplifier, a servo motor, means through which the output of said first amplifier is imparted to said second amplifier, conductor means through which the electrical output of said second amplifier is imparted to said servo motor, and means through which said first and second electromagnetic transducers are driven by the mechanical output of said servo motor, said gain compensator comprising a nonlinear potentiometer which is energized by the input voltage to said second electromagnetic transducer and is provided with an adjustable tap which is adapted to be positioned by the mechanical output of said servo motor, a second servo motor which is electrically connected to said tap, and an inverting potentiometer which is energized by said first amplifier and is provided with an adjustable tap which is electrically connected to said second amplifier and is adapted to be positioned by the mechanical output of said second servo motor.

11. An analog multiplier-divider comprising a variable gain amplifier unit having a first amplifier and a second amplifier, an input terminal through which input signals are adapted to be imparted to said first amplifier, a first electromagnetic transducer having an input terminal through which input signals are adapted to be imparted thereto and an output terminal through which the output of said first electromagnetic transducer is imparted to a receiver, a second electromagnetic transducer having an input terminal through which input signals are adapted to be imparted thereto and an output lead through which the output of said second electromagnetic transducer is imparted to said first amplifier, a servo motor, means through which the output of said first amplifier is imparted to said second amplifier, conductor means through which the electrical output of said second amplifier is imparted to said servo motor, and means through which said first and second electromagnetic transducers are driven by the mechanical output of said servo motor, a polarity reversing switching means which is interposed between the variable gain amplifier unit and said servo motor, a relay by which said switching means is adapted to be actuated, and a phase sensitive detector by which the energization of said relay is controlled, said phase sensitive detector being connected to the input terminal of said second electromagnetic transducer, and a gain compensator which comprises, a nonlinear potentiometer which is energized by the input voltage to said second electromagnetic transducer and is provided with an adjustable tap which is adapted to be positioned by the mechanical output of said servo motor, a second servo motor which is electrically connected to said tap, and an inverting potentiometer which is energized by said first amplifier and is provided with an adjustable tap which is electrically connected to said second amplifier and is adapted to be positioned by the mechanical output of said second servo motor.

References Cited by the Examiner

UNITED STATES PATENTS

| | | | |
|---|---|---|---|
| 2,855,148 | 10/58 | Schroeder et al. ------ | 235—195 |
| 2,949,592 | 8/60 | Smiley --------------- | 336—148 |
| 3,011,119 | 11/61 | Starks-Field et al. ------ | 323—53 |
| 3,052,859 | 9/62 | Bers ----------------- | 336—131 |

FOREIGN PATENTS

| | | |
|---|---|---|
| 757,251 | 9/56 | Great Britain. |

OTHER REFERENCES

"Electronic Analogue Computers," by Korn and Korn, 1952, McGraw-Hill Book Co. Inc., New York.

"An Electrodynamic Device for Multiplication and Division," by Vaisman, from Automation Express, November 1958, pp. 22–26.

MALCOLM A. MORRISON, *Primary Examiner.*

WALTER W. BURNS, Jr., *Examiner.*